Oct. 8, 1957  G. W. JACKSON  2,809,051
VEHICLE SUSPENSION HAVING FLUID PRESSURE HEIGHT CONTROL
Filed Oct. 6, 1955  4 Sheets-Sheet 4
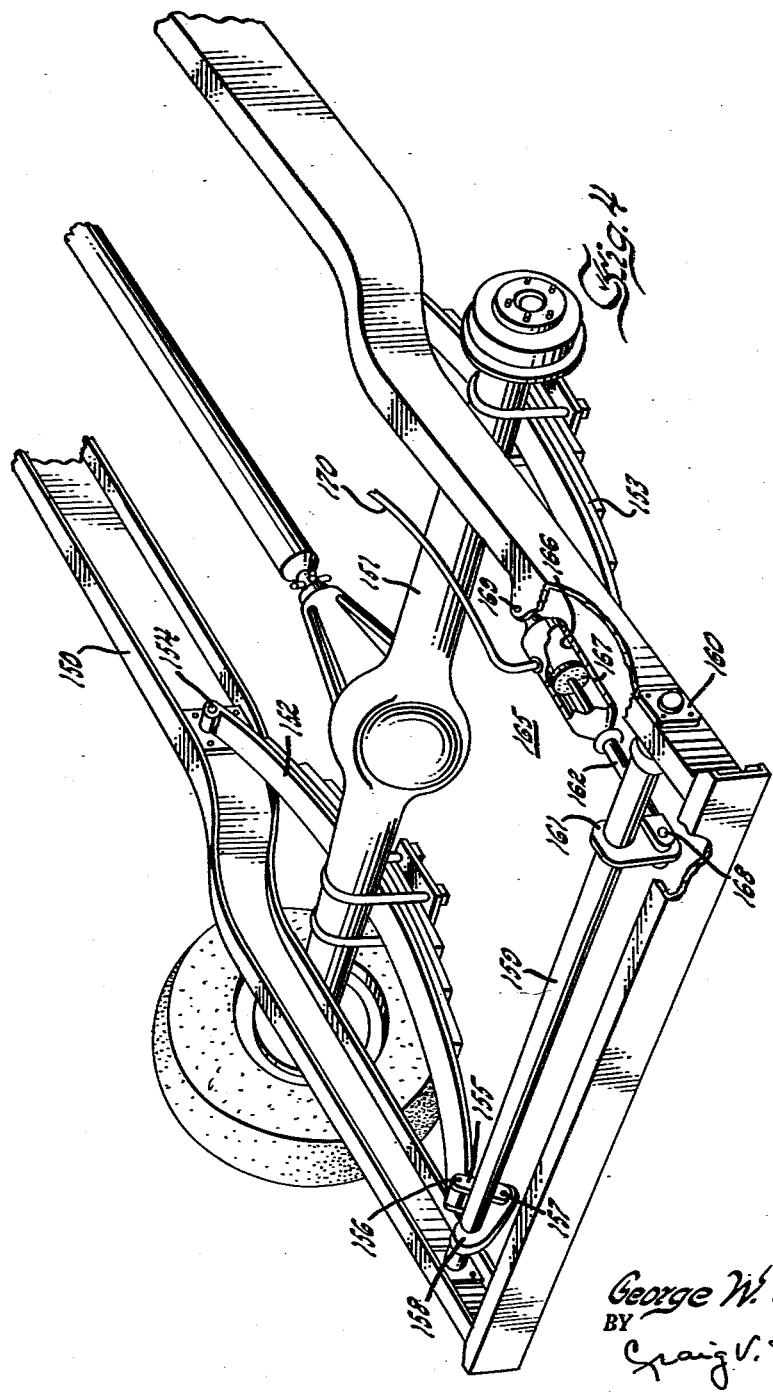
INVENTOR.
George W. Jackson
BY
Craig V. Morton
HIS ATTORNEY United States Patent Office 2,809,051
Patented Oct. 8, 1957

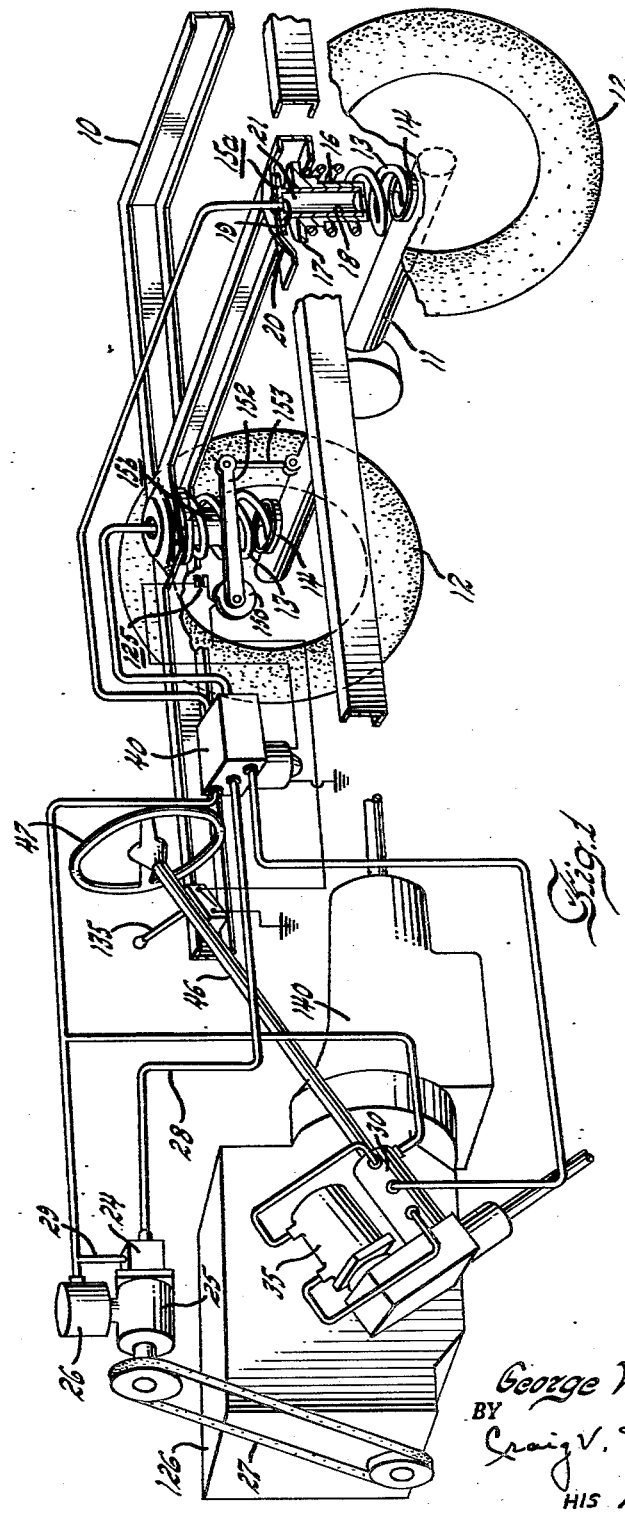

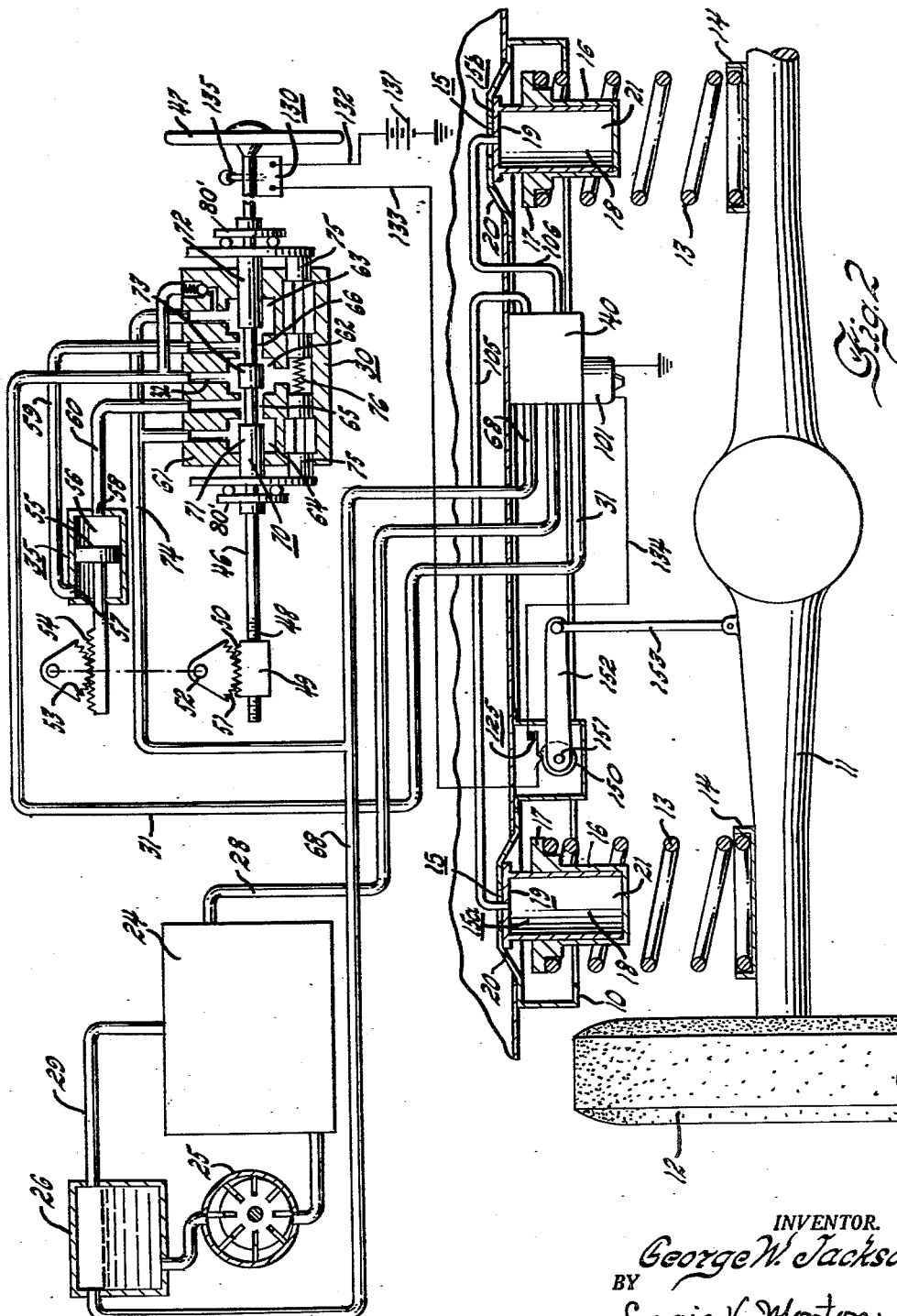

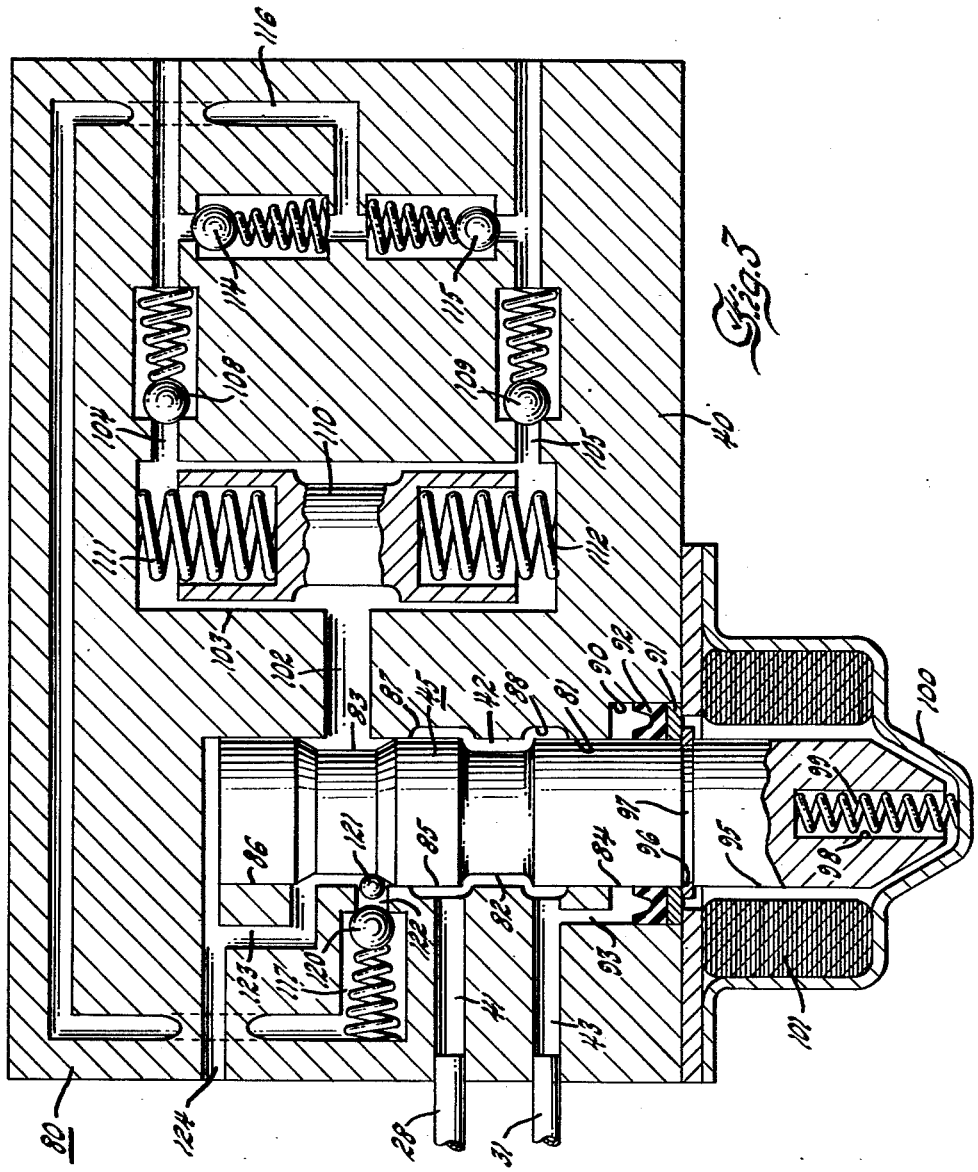

2,809,051

VEHICLE SUSPENSION HAVING FLUID PRESSURE HEIGHT CONTROL

George W. Jackson, Dayton, Ohio, assignor to General Motors Corporation, Detroit, Mich., a corporation of Delaware Application October 6, 1955, Serial No. 538,929

6 Claims. (Cl. 280—124)

This invention relates to an apparatus adapted for establishing and maintaining a predetermined clearance height between the sprung mass, that is the body, and the unsprung mass, that is the axle, of the vehicle.

It is the conventional practice in motor vehicles to support the body of the vehicle on mechanical springs, the springs in turn being supported by the axles of the vehicle. It is a well known function of mechanical springs that when loaded with a predetermined load value they will compress to a predetermined value and will thereafter remain in a static condition so long as the load on the spring does not change. Thus, it is possible to spring support the body of the motor vehicle relative to the axles and establish a predetermined clearance height between the body and the axles by proper engineering of the springs so that they will be compressed under the predetermined load of the car body to result in a predetermined clearance height between the body and the axle of the vehicle.

If the load on the springs that had to be considered was only the weight of the body itself, no serious engineering problem would result for the spring could be designed with a maximum of resilience and of just sufficient strength to position the body at a predetermined clearance height relative to the axle. But passenger vehicles have the load varied considerably so that if a mechanical spring is engineered to have just sufficient strength to maintain a predetermined clearance height between the body and the axle when a body is in an unloaded condition, the spring will have insufficient strength to hold the body in the predetermined position when the load in the body increases. Hence, a fully loaded vehicle may, under such conditions, allow the body to ride on the axle or on the wheels of the vehicle.

On the other hand if a mechanical spring is made sufficiently stiff or strong to support the maximum load that would ever be placed in the vehicle, the spring becomes so stiff in action that the ride quality of the spring suspension is completely lost, as far as any practical value is concerned.

Thus, the mechanical spring suspension for motor vehicles, particularly the passenger car type, has largely been a matter of compromise in the resilience of the spring to give as much desirable resilience for spring suspension and yet prevent the body from riding too low that it will strike the axle or the wheel upon any movement of the axle caused by road roughness.

The ideal situation is to be able to move the body of the vehicle relative to the mechanical spring in proportion to the degree of compression of the spring so that even though the spring compresses increasingly under increasing load, the movement of the body relative to the spring will maintain a substantially constant predetermined clearance height between the body of the vehicle and the axles. The effect is much the same as increasing the length of the spring in proportion to the increased load.

It is therefore an object of this invention to provide apparatus operably connected with the mechanical spring means of a vehicle to effect movement of the body of the vehicle relative to the mechanical spring means in response to load changes in the vehicle whereby to maintain substantially constant a predetermined clearance height between the body of the vehicle and the axles of the vehicle.

It is another object of the invention to provide apparatus for accomplishing the foregoing object wherein an expansible device is operably associated with the mechanical springs of the vehicle to effect raising and lowering of the body of the vehicle relative to the springs in response to varying load conditions in the body of the vehicle.

It is another object of the invention to provide apparatus for accomplishing the results of the foregoing objects wherein the movement of the body relative to the mechanical springs is effected automatically under suitable operator control when the vehicle is standing still, and which automatic operation of the compensating control is rendered ineffective whenever the vehicle is in motion.

It is still another object of the invention to provide apparatus in accordance with the foregoing objects that includes a source of fluid under pressure for actuating fluid actuated components on a motor vehicle wherein the source of fluid is utilized when the vehicle is standing still to effect actuation of apparatus that effects movement of the body relative to the mechanical springs, and wherein there are provided controls to insure primary utilization of the source of fluid under pressure by the fluid actuated components on the vehicle whenever the vehicle is in motion.

Further objects and advantages of the present invention will be apparent from the following description, reference being had to the accompanying drawings wherein a preferred form of the invention is clearly shown.

In the drawings:

Figure 1 is a schematic illustration of apparatus for establishing and maintaining a constant clearance height between the body and the axle of a vehicle.

Figure 2 is a further schematic illustration of the system illustrated in Fig. 1 but with certain controls illustrated in cross section for clarity of illustration.

Figure 3 is a cross sectional view of a vehicle mechanism for insuring primary utilization of the fluid under pressure by the fluid actuated components of the vehicle.

Figure 4 is a perspective elevational view of a modified spring suspension arrangement for a motor vehicle.

In Figure 1 there is illustrated schematically a vehicle incorporating a system and apparatus for establishing and maintaining a predetermined height clearance between the sprung mass, or body, and the unsprung mass, or axle, of a motor vehicle. The motor vehicle comprises a chassis frame 10 on which a conventional body is placed. The rear axle 11 carries the usual wheels 12 and a mechanical spring 13 supports the chassis 10 upon the axle 11.

As more particularly illustrated in Figure 2 the mechanical spring unit comprises the helical coil spring 13 having the lower end thereof positioned on a spring pad 14 fixedly secured to the axle 11. On the upper end of the coil spring 13 there is placed an expansible and contractable device 15 that supports the chassis 10 upon the spring 13 and provides for movement of the chassis 10 relative to the spring 13 in the manner hereinafter described.

The expansible and contractable device 15 comprises a cylinder 16 having a radial annular flange 17 forming a spring seat for the upper end of the suspension spring 13. A hollow piston 18 is slidably disposed within the cylinder 16 and has the upper closed end wall 19 adapted to engage and support the chassis frame by engagement with a locating recess 20 provided in the chassis 10. The lower end of the piston 18 is open, the interior chamber 21 of the hollow piston 18 being adapted to receive hydraulic fluid under pressure to raise the piston 18 relative to the cylinder 16, or lower the same, and thereby move the chassis frame 10 upwardly or downwardly relative to the suspension spring 13, as more fully described hereinafter.

The motor vehicle is provided with fluid actuated, in this instance hydraulically actuated components, specifically illustrated herein as the hydraulically actuated power steering components of a motor vehicle. The fluid pressure source comprises a pump 25 that is driven from the vehicle engine 126 by means of a suitable belt and pulley drive 27. The pump 25 receives fluid from a reservoir 26 and delivers fluid under pressure into a flow control and by-pass valve 24. The flow control and by-pass valve is adapted to maintain a predetermined minimum pump pressure in the discharge line 28 for continuous supply to the hydraulically actuated component to insure supply of fluid to the component at all times the vehicle is operating. This flow control and by-pass valve is also connected to the reservoir 26 by means of a line 29 so that fluid in excess of that required to maintain the predetermined minimum pressure in the fluid line 28 will be by-passed to the reservoir 26.

Normally the controlled pressure line 28 connects directly with the control valve 30 that regulates the flow of hydraulic fluid to the fluid actuated component 35, but in this invention the pressure line 28 is first directed to a flow regulating valve 40 that is more particularly disclosed in Fig. 3. The pressure line 28 connects with the inlet port 41 of the valve 40. The port 41 communicates with a valve chamber 42 and a port 43 provides for discharge of fluid under pressure from the chamber 42 into the fluid line 31 that connects with the inlet port 32 of the flow regulating valve 30, see Fig. 2. It will thus be seen that so long as the valve 45 of the valve member 40 is in a position illustrated in Fig. 3 that complete freedom of flow of fluid under pressure is provided to the inlet port 32 of the flow regulating valve 30 to supply the hydraulically operated component 35.

The control valve 30 and the hydraulically operated component 35 provide component parts of the hydraulically operated power steering unit of a motor vehicle.

The steering unit comprises a steering column 46 having the usual steering wheel 47. The steering column 46 includes a screw 48 that carries the nut 49 having the rack 50 engaging the rack segment 51 carried on the shaft 52 that is connected with the pitman shaft for actuating the front wheels of the motor vehicle. The shaft 52 connected with the pitman shaft is also connected with a rack segment 53 that engages a rack 54 actuated by the hydraulic component 35. The rack 54 is connected with a piston 55 operated within a cylinder 56 adapted to be supplied with fluid through either of the ports 57 or 58 through the lines 59 and 60, or exhaust fluid through these lines whereby the piston 55 is reciprocated in the cylinder 56 to power drive the rack segment 53 and thereby power actuate the rack segment 51 and the pitman shaft for steering the front wheels.

The control valve 30 for regulating supply of fluid under pressure or exhausting fluid from the hydraulically actuated component 35 comprises the body 61 having the three chambers 62, 63 and 64 interconnected by passages 65 and 66. The pressure supply line from the pump source 26 connects with the chamber 62 while the two end chambers 63 and 64 connect with the return line 68 that connects with the reservoir 26. The two supply lines 59 and 60 for the hydraulically actuated component 35 connect with the passages 65 and 66 respectively.

A spool valve 70 having the two end portions 71 and 72 and a middle portion 73 is adapted for axial reciprocation in the body 61 to direct flow of fluid between the passages 59 and 60 or allow the fluid to circulate through the return lines 74 and 68 to the reservoir. The body 61 of the valve 30 is provided with the self-centering plungers 75 and the spring 76 which normally position the spool 70 in the position illustrated in Fig. 2.

Normally, when steering actuation is not required fluid under pressure circulates from the pump source through the line 31 into the chamber 62 and thence through the passages 65 and 66 into the return lines 74 and 68 to the reservoir 26. When steering actuation is to be obtained, and the steering wheel is turned in one direction or another, the reaction of the screw 48 and the nut 49 is such as to cause one or the other of the thrust bearings 80' to move the spool 70 axially in one direction or the other, depending on the direction of the rotation of the steering wheel 47 whereby the center spool member 70 is moved to close either passage 65 or 66. For example, if the reaction is such as to cause the spool 70 to move in a right hand direction, passage 66 will be closed whereby fluid under pressure entering the chamber 62 is directed through the line 60 to the right hand end of the power unit 35, exhaust of fluid being effected from the left hand end of the power unit through the line 59 into the passage 66 and thence into the chamber 63 for return to the reservoir through the return lines 74 and 68. Reverse actuation of the steering wheel will of course cause reverse actuation of the spool 70 to effect discharge of fluid under pressure through the line 59 into the power unit 35 and exhaust of fluid through the line 60 back to the reservoir 26.

Whenever the motor vehicle is in motion it is essential that the power steering component 35 be given precedence over any actuation of the expansible device 15 disposed between the mechanical spring 13 and the chassis 10 to avoid any by-passing of fluid pressure from the steering control system. For this purpose, the fluid control valve 40 is disposed in the fluid pressure supply lines 28 and 31 between the pump source 26 and the flow control and regulating valve 30 for the hydraulically actuated component 35.

The valve 40 is more particularly disclosed in Fig. 3 and comprises a valve body 80 having an axially movable valve member 45 disposed in a valve bore 81. The valve member 45 has the reduced diameter portions 82 and 83 whereby the land portions 84, 85 and 86 form the guide surfaces and fluid flow control elements. An inlet port 41 communicates with the annular recess 87 adjacent the land portion 85, a similar annular recess port 88 being connected with the discharge port 43 and disposed adjacent the land portion 84 of the valve 45.

The valve 45 has the land portion 84 thereof extending through a cylinder chamber 90 that reciprocably receives a piston member consisting of the annular metal member 91 and the annular rubber member 92, the member 92 forming a seal against loss of fluid pressure from the chamber 90. The chamber 90 communicates with the fluid pressure discharge passage 43 by means of the port 93.

The valve 45 has an end portion 95 that projects beyond the cylinder chamber 90 and has a snap ring 96 positioned in a grove 97. The end portion 95 has an axial bore 98 that receives a compression spring 99 held between the inner end of the bore 98 and the casing 100 that encloses a solenoid coil 101 that surrounds the extending end portion 95 of the valve 45 whereby the portion 95 forms the wall of the solenoid coil. The casing 100 is secured to the body 80 by any suitable fastening device.

The valve bore 81 has extending therefrom a radial port 102 adjacent the small diameter portion 83 of the valve 45. This port 102, at proper times hereinafter described, supplies fluid under pressure into the chamber 103 that has discharge ports 104 and 105 at opposite ends thereof. The port 104 connects with the supply line 105 that connects with the expansible device 15a. Similarly, the port 105 connects with a supply line 106 that connects with the expansible device 15b, see Figures 1 and 2. Check valves 108 and 109 are provided in the ports 104 and 105 respectively to prevent return flow of fluid under pressure from the expansible devices 15a and 15b.

The chamber 103 in the valve body 80 contains a fluid flow equalizing valve 110 that is normally held in a central position, shown on the drawing, by the opposing balancing springs 111 and 112. The equalizing valve 110 insures the equality of flow of fluid under pressure to ports 104 and 105 so that the expansible devices 15a and 15b will be supplied with equivalent volumes of fluid to insure their expanding at exactly the same rate.

Check valves 114 and 115 are provided between the ports 104 and 105 for return flow of fluid during exhausting of the expansible devices 15a and 15b, the exhaust fluid flowing through the port 116 to the check valve chamber 117 which is normally closed when the valve 45 is in the position illustrated in Fig. 3.

The check valve 120 provided in the chamber 117 is opened by means of a ball actuator 121 when the valve member 45 moves in an upward direction. Exhaust of fluid from the chamber 117 will then be effected through the port 122, the passage 123 and the exhaust port 124 that connects with the exhaust line 68 returning to the reservoir 26.

The valve member 45 is adapted to be moved downwardly against the action of the spring 99 by means of the solenoid coil 101 when the switch member 125 is closed concurrently with the series arranged switch 130. The switch 130 is a manually actuated operator controlled switch which when closed renders effective an electric circuit from the battery 131 through the lines 132 and 133 to the switch 125 that in turn is connected through the line 134 with the solenoid coil 101. The switch 130 is preferably a switch that is operated concurrently with the automatic transmission control so that when the transmission selector lever 135 is moved to place an automatic transmission in neutral or parked condition, the switch 130 wil be closed, and whenever the automatic transmission selector lever 135 is moved to any other position, other than park or neutral, the switch 130 will be open. This insures that the solenoid coil 101 can be energized only when the vehicle is in a parked condition, that is standing still even though the engine may be running. The selector lever 135 is that which is provided for controlling any conventional automatic transmission 140, such transmissions being well-known in the art and being deemed unnecessary of description.

A control switch 125 is actuated by a cam 150 carried on a shaft 151 that also carries the arm 152 that is connected to the axle 11 by means of the link 153. Thus when the chassis 10 moves downwardly toward the axle 11 the switch 125 will be closed, and will not again open until the chassis 10 returns to a predetermined established height clearance relative to the axle 11.

*Operation*

Assuming the engine of the vehicle is operating, the pump source 25 is delivering fluid under pressure into the line 28, since the pump is driven by the engine. With the selector lever 135 in neutral or park condition, the switch 130 will be closed thereby energizing the electric circuit connected with the solenoid coil 101. But assuming the chassis frame 10 to be at a predetermined clearance height relative to the axle 10, the switch 125 will be open whereby the solenoid coil 101 will be deenergized.

With the solenoid coil deenergized and the pump source 26 supplying fluid under pressure into the line 28 and thus into the chambers 42 and 90 of the control valve 40, the piston 92, 91 will be moved downwardly to the position shown in Fig. 3 to place the valve 45 in the position shown in Fig. 3. With the valve 45 in the position shown fluid under pressure is free to circulate from the pump source 26 through the valve 40 and to the control valve 30 for the power actuator 35.

Should the passenger load be increased within the body of the vehicle, the chassis 10 will now move downwardly to compress the supporting spring 13, the degree of compression of the springs being in proportion to the increase in loading of the chassis frame 10. This movement of the chassis frame 10 will cause upward movement of the arm 152 to rotate the cam 150 and effect closing of the switch 125. Since the electric circuit containing the switch 125 is energized because of the previous closing of switch 130 with the selector lever 135 in neutral position the solenoid coil 101 will be energized to move the valve 45 downwardly against the compression spring 99. This movement of the valve 45 causes the land portion 85 of the valve to move into the valve bore below the recess 87 and move out of the valve bore above the recess 87 so as to close off flow of fluid under pressure from the passage 41 to the passage 43 and open flow of fluid under pressure from the passage 41 into the port 102. Check valves 114 and 115 prevent any flow of fluid through the check valve 120 and thus by-passing of the equalizing valve 110.

With fluid under pressure entering the port 102 the fluid flows past the equalizing valve 110 into the passages 104 and 105 and through the check valves 108 and 109 for delivery into the expansible devices 15a and 15b. Fluid will flow into the expansible devices until the pistons 21 of these devices are moved upwardly into the cylinders a sufficient distance to raise the chassis frame relative to the spring 13 to establish the predetermined height clearance between the chassis frame 10 and the axle 11 whereupon the switch 125 will open and allow to deenergize the solenoid coil 101 and allow the valve 45 to be returned to the position shown in Fig. 3 by the action of the spring 99 wherein the snap ring 96 stops against the piston 91, 92 that is held in the position shown in Fig. 3 by means of fluid pressure that still stands in the chamber 90.

With the return of the valve 45 to the position shown in Fig. 3 no further movement of the pistons 21 of the expansible devices 15 is effected and the devices will remain in the positions established by the addition of the fluid until such time as the fluid is subsequently exhausted from the hollow pistons 21.

Whenever the selector lever 135 for the automatic transmission 140 is moved from the neutral or park position to a drive or reverse position, the switch 130 is opened and no actuation of the valve 45 can thereafter be effected. This assures that when the vehicle is ready for movement, as with the selector lever 135 in drive or reverse position, the fluid pump source 26 will give primary preference to the steering control system.

At any time the load is increased in the vehicle due to passenger increase, it is only necessary for the operator to move the selector lever 135 into neutral or park position to close the switch 130 so as to activate the valve 45 in the manner heretofore described so as to reestablish the predetermined clearance height between the chassis frame 10 and the axle 11.

After an increase of load in the vehicle, and fluid has been delivered into the expansible device 15a and 15b to expand the same to counteract the compression of the springs 13, and the load is then lightened, the springs 13 will reexpand to raise the chassis 10 to a level above the predetermined clearance height. When this occurs, the operator shall stop operation of the engine, at which time the pump 25 stops delivering fluid under pressure and the pressure lines 28, passage 41 and 43 of the valve 40 bleed to the reservoir 26 to allow the fluid in chamber 90 to be exhausted whereby the compression spring 99 will move the valve 45 upwardly. This movement of the valve 45 will cause the ball actuator 121 to engage the check valve 120 in the valve 40 and open the exhaust passage 116 so that fluid under pressure can exhaust from the fluid expansible devices 15a and 15b backwardly through the lines 105 and 106, through the check valves 114 and 115 into the exhaust line 116 and thence through the now open check valve 120 into the exhaust line 124 that connects with the conduit 68 for return of the fluid to the reservoir 26. The fluid will exhaust from the expansible devices 15a and 15b until the pistons 21 thereof again bottom on the lower wall of the cylinders 16 which reestablishes the predetermined height clearance of the frame 10 relative to the axle 11 with the vehicle in a now unloaded condition.

In Fig. 4 there is disclosed a modified arrangement of a mechanical spring suspension system for a motor vehicle incorporating an expansible device to effect raising and lowering of the chassis frame of the vehicle relative to the spring in response to loading conditions in the vehicle.

In the arrangement of Fig. 4 the chassis frame 150 is supported upon the axle 151 by means of the semieliptical mechanical springs 152 and 153. The forward end of each of the springs 152 and 153 are secured to the chassis frame 150 by means of a shackle connection 154. The rearward ends of the springs 152 and 153 are connected to a shackle link 155 having one end pivotally mounted to the springs by means of pivot pins 156 and the opposite end pivotally attached by means of pivot pins 157 to arms 158 that are integral with a bar 159 that extends transversely of the chassis frame 150 and is carried on the chassis frame by means of suitable supports 160.

The bar 159 is rotatable in the support members 160 and has a member 161 integral therewith that is connected to the piston rod 162 extending from the expansible device 165 that comprises a cylinder 166 containing a reciprocable piston 167 from which the rod 162 extends. The rod 162 is pivotally connected to the member 161 by the pivot pin 168 and the opposite end of the expansible device 165 is connected to the chassis frame 150 by means of the pin 169.

The cylinder 166 of the expansible device 165 is supplied with hydraulic fluid under pressure through the line 170 that corresponds with either of the lines 105 or 106 of the system illustrated in Figures 1 and 2.

From the foregoing description it will be obvious that when fluid under pressure is supplied into the cylinder 166 that the piston 167 will move toward the rear of the chassis frame 150 thereby rotating the bar 159 in a clockwise direction and effect thereby clockwise rotation of the shackle links 155 to raise the chassis frame 150 relative to the semieliptical springs 152. This action occurs upon loading of the vehicle under conditions of control of the system as heretofore disclosed and described with reference to Figures 1 and 2.

While the form of embodiment of the invention as herein disclosed constitutes a preferred form, it is to be understood that other forms might be adopted as may come within the scope of the claims which follow.

What is claimed is as follows:

1. Apparatus for establishing and maintaining a relatively constant static clearance height between the sprung mass and the unsprung mass of a vehicle, including in the combination, an unsprung mass comprising an axle, a sprung mass comprising a vehicle frame, resilient supporting spring means supporting the sprung mass upon the unsprung mass including expansible and contractable fluid actuated means operably effective with said supporting means by expansion and contraction of the said fluid actuated means to counteract loading compression and unloading expansion respectively of the said supporting means and effect thereby a relatively constant static clearance height between the sprung mass and the unsprung mass, a fluid pressure actuating system for pressure actuation of a component of a vehicle and including a fluid pressure pump source and control valve means to regulate flow of fluid from the pump source to the said component, and a second fluid flow control valve means between said first control valve means and said pump source having one position normally to provide for precedence of fluid flow from the pump source to said first control valve means a second position to cut off the said flow and direct the same to said fluid actuated means and a third position to exhaust fluid from said fluid actuated means.

2. Apparatus for establishing and maintaining a relatively constant static clearance height between the sprung mass and the unsprung mass of a vehicle, including in the combination, an unsprung mass comprising an axle, a sprung mass comprising a vehicle frame, resilient supporting spring means supporting the sprung mass upon the unsprung mass including expansible and contractable fluid actuated means operably effective with said supporting means by expansion and contraction of the said fluid actuated means to counteract loading compression and unloading expansion respectively of the said supporting means and effect thereby a relatively constant static clearance height between the sprung mass and the unsprung mass, a fluid pressure actuating system for pressure actuation of a component of a vehicle and including a fluid pressure pump source and control valve means to regulate flow of fluid from the pump source to the said component, a second fluid flow control valve means between said first control valve means and said pump source having one position normally to provide for precedence of fluid flow from the pump source to said first control valve means a second position to which the valve is actuated from the first position to cut off the said flow and direct the same to said fluid actuated means and a third position to which the valve is actuated from either the first or second position to exhaust fluid from said fluid actuated means, and control means responsive to a change in static clearance height between the sprung mass and the unsprung mass to effect movement of said second control valve means between its first and second positions.

3. Apparatus for establishing and maintaining a relatively constant static clearance height between the sprung mass and the unsprung mass of a vehicle, including in the combination, an unsprung mass comprising an axle, a sprung mass comprising a vehicle frame, resilient supporting spring means supporting the sprung mass upon the unsprung mass including expansible and contractable fluid actuated means operably effective with said supporting means by expansion and contraction of the said fluid actuated means to counteract loading compression and unloading expansion respectively of the said supporting means and effect thereby a relatively constant static clearance height between the sprung mass and the unsprung mass, a fluid pressure actuating system for pressure actuation of a component of a vehicle and including a fluid pressure pump source and control valve means to regulate flow of fluid from the pump source to the said component, a second fluid flow control valve means between said first control valve means and said pump source having one position normally to provide for precedence of fluid flow from the pump source to said first control valve means a second position effected in response to a change in clearance height between the sprung mass and the unsprung mass to cut off the said flow and direct the same to said fluid actuated means and a third position effected in response to discontinuance of pump actuation to exhaust fluid from said fluid actuated means, control means responsive to a change in static clearance height between the sprung mass and the unsprung mass to effect the said movement of said second control valve means between its first and second positions, and a vehicle operator manual control means to render said last mentioned control means ineffective.

4. Apparatus for establishing and maintaining a relatively constant static clearance height between the sprung mass and the unsprung mass of a vehicle, including in the combination, an unsprung mass comprising an axle, a sprung mass comprising a vehicle frame, resilient supporting spring means supporting the sprung mass upon the unsprung mass including expansible and contractable fluid actuated means operably effective with said supporting means by expansion and contraction of the said fluid actuated means to counteract loading compression and unloading expansion respectively of the said supporting means and effect thereby a relatively constant static clearance height between the sprung mass and the unsprung mass, a fluid pressure actuating system for pressure actuation of a component of a vehicle and including a fluid pressure pump source and control valve means to regulate flow of fluid from the pump source to the said component, and a second fluid flow control valve means between said first control valve means and said pump source having one position effected by fluid pressure from the pump source to provide for fluid flow from the pump source to said first control valve means a second position effected by vehicle operator manual control to cut off the said flow and direct the same to said fluid actuated means and a third position effected by discontinuance of fluid pressure from the pump source to exhaust fluid from said fluid actuated means.

5. Apparatus for establishing and maintaining a relatively constant static clearance height between the sprung mass and the unsprung mass of a vehicle, including in the combination, an unsprung mass comprising an axle, a sprung mass comprising a vehicle frame, resilient supporting spring means supporting the sprung mass upon the unsprung mass including an expansible and contractable fluid actuated means operably connected with said spring means to effective raising and lowering of the sprung mass relative to the spring means by expansion and contraction of the said fluid actuated means to counteract loading compression and unloading expansion respectively of the said spring means and effect thereby a relatively constant static clearance height between the sprung mass and the unsprung mass, a fluid pressure actuating system for pressure actuation of a component of a vehicle and including a fluid pressure pump source and control valve means to regulate flow of fluid from the pump source to the said component, a second fluid flow control valve means between said first control valve means and said pump source having one position to permit fluid flow from the pump source to said first control valve means, a second position to cut off the said flow and direct the same to said fluid actuated means to expand the same and raise the sprung mass relative to said spring means and a third position to exhaust fluid from the fluid actuated means to allow contraction of the same with resulting movement of the sprung mass toward said spring means, control means responsive to a change in static clearance height between the sprung mass and the unsprung mass to effect movement of said second control valve means from its first position to its second position, and other control means rendering said last mentioned control means ineffective when the vehicle is in motion, said second fluid flow control valve means including fluid actuated means actuated by fluid pressure from said pump source to position the second fluid flow control valve means in its said first position so long as the said other control means is functionally effective.

6. Apparatus for establishing and maintaining a relatively constant static clearance height between the sprung mass and the unsprung mass of a vehicle, including in the combination, an unsprung mass comprising an axle, a sprung mass comprising a vehicle frame, resilient supporting spring means supporting the sprung mass upon the unsprung mass, an expansible and contractable fluid actuated means operably connected with said spring means to effect raising and lowering of the sprung mass relative to the spring means by expansion and contraction of the said fluid actuated means to counteract loading compression and unloading expansion respectively of the said spring means and effect thereby a relatively constant static clearance height between the sprung mass and the unsprung mass, a fluid pressure actuating system for pressure actuation of a component of a vehicle and including a fluid pressure pump source and control valve means to regulate flow of fluid from the pump source to the said component, a second fluid flow control valve means between said first control valve means and said pump source having one position to permit fluid flow from the pump source to said first control valve means, a second position to cut off the said flow and direct the same to said fluid actuated means to expand the same and raise the sprung mass relative to said spring means and a third position to exhaust fluid from the fluid actuated means to allow contraction of the same with resulting movement of the sprung mass toward said spring means, control means responsive to a change in static clearance height between the sprung mass and the unsprung mass to effect movement of said second control valve means from its first position to its second position, and other control means rendering said last mentioned control means ineffective when the vehicle is in motion, said second fluid flow control valve means including fluid actuated means actuated by fluid pressure from said pump source to position the second fluid flow control valve means in its said first position so long as the said other control means is functionally effective, said second fluid flow control valve means also including spring means to position the said fluid flow control valve means in its said third position upon discontinuance of fluid pressure from the said pump source.

References Cited in the file of this patent
UNITED STATES PATENTS
2,687,311    Nallinger _____ Aug. 24, 1954